(12) United States Patent
Hecker

(10) Patent No.: US 8,559,103 B2
(45) Date of Patent: Oct. 15, 2013

(54) MICROSCOPE FOR CONVENTIONAL FLUORESCENCE MICROSCOPY AND TOTAL INTERNAL REFLECTION MICROSCOPY

(75) Inventor: Andreas Hecker, Asslar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 913 days.

(21) Appl. No.: 12/526,777

(22) PCT Filed: Feb. 8, 2008

(86) PCT No.: PCT/EP2008/051535
§ 371 (c)(1),
(2), (4) Date: Aug. 11, 2009

(87) PCT Pub. No.: WO2008/098875
PCT Pub. Date: Aug. 21, 2008

(65) Prior Publication Data
US 2010/0118394 A1    May 13, 2010

(30) Foreign Application Priority Data

Feb. 12, 2007 (DE) .......................... 10 2007 018 922

(51) Int. Cl.
*G02B 21/06* (2006.01)
*G02B 21/00* (2006.01)
*G02B 21/10* (2006.01)
*G02B 27/10* (2006.01)

(52) U.S. Cl.
CPC ................. *G02B 21/06* (2013.01); *G02B 27/10* (2013.01); *G02B 21/00* (2013.01)
USPC ............ 359/388; 359/368; 359/385; 359/618

(58) Field of Classification Search
CPC ......... G02B 21/06; G02B 21/00; G02B 27/10
USPC ........................................ 359/368–390, 618
See application file for complete search history.

(56) References Cited

U.S. PATENT DOCUMENTS

| 6,130,776 A | 10/2000 | Takaoka |
| 6,633,375 B1 * | 10/2003 | Veith et al. ................. 356/237.4 |

(Continued)

FOREIGN PATENT DOCUMENTS

| DE | 101 08 796 | 9/2002 |
| DE | 101 43 481 | 3/2003 |

(Continued)

OTHER PUBLICATIONS

Notification of Transmittal of Translation of the International Preliminary Report on Patentability, Form PCT/IB/338 for PCT/EP2008/051535, mailing date Sep. 17, 2009.

(Continued)

*Primary Examiner* — Thong Nguyen
(74) *Attorney, Agent, or Firm* — Schlee IP International, P.C.; Alexander R. Schlee

(57) ABSTRACT

A microscope for conventional fluorescence microscopy (epi-fluorescence) and for total internal reflection microscopy is described. A first light source emits conventional fluorescent illumination light along a first illumination path and a second light source emitting evanescent illumination light along a second illumination path that differs from the first illumination path. An objective emits light onto an object to be viewed. A beam combiner directs the two lights into the objective while keeping their beam paths geometrically separated. The beam combiner comprises at least two spatially separated first zones for coupling in the conventional fluorescent illumination light and at least two spatially separated second zones for coupling in the evanescent illumination light. The first and second zones are adapted in their size and position to objective pupils of different objectives.

20 Claims, 3 Drawing Sheets

(56) References Cited

U.S. PATENT DOCUMENTS

| | | |
|---|---|---|
| 7,405,874 B2* | 7/2008 | Hecker ............... 359/381 |
| 2002/0097489 A1 | 7/2002 | Kawano et al. |
| 2003/0223108 A1* | 12/2003 | Miyashita et al. ............ 359/389 |
| 2004/0001253 A1 | 1/2004 | Abe et al. |
| 2004/0246573 A1 | 12/2004 | Tsuchiya et al. |
| 2005/0174631 A1 | 8/2005 | Nishiwaki et al. |

FOREIGN PATENT DOCUMENTS

| | | |
|---|---|---|
| DE | 102 17 098 | 11/2003 |
| DE | 102 29 935 | 1/2004 |
| DE | 103 09 269 | 9/2004 |
| DE | 10 2008 000 035 | 7/2009 |
| EP | 1 752 809 | 2/2007 |
| JP | 11084260 | 3/1999 |
| JP | 2003279860 | 10/2003 |

OTHER PUBLICATIONS

International Preliminary Report on Patentability, Form PCT/IB/373 for PCT/EP2008/051535, Issuing date Sep. 8, 2009.

Written Opinion of the International Searching Authority, PCT/ISA/237 for PCT/EP2008/051535, mailing date Jul. 2, 2008.

* cited by examiner

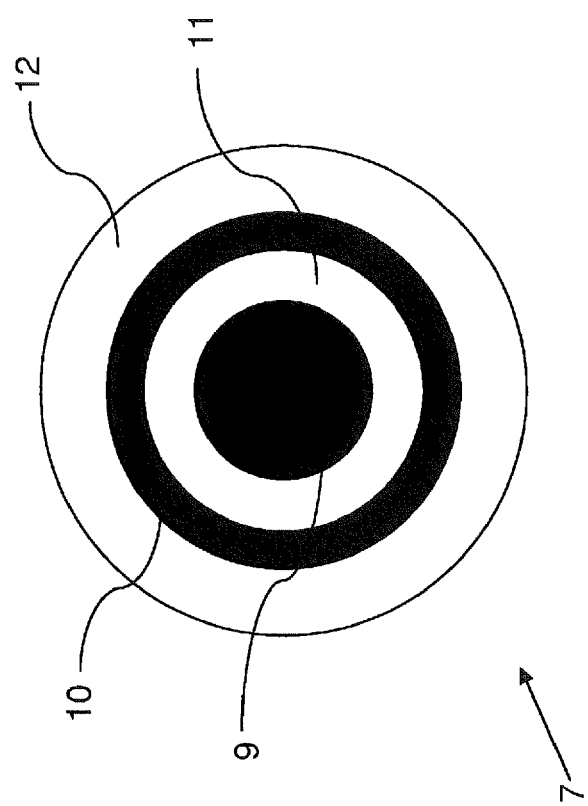

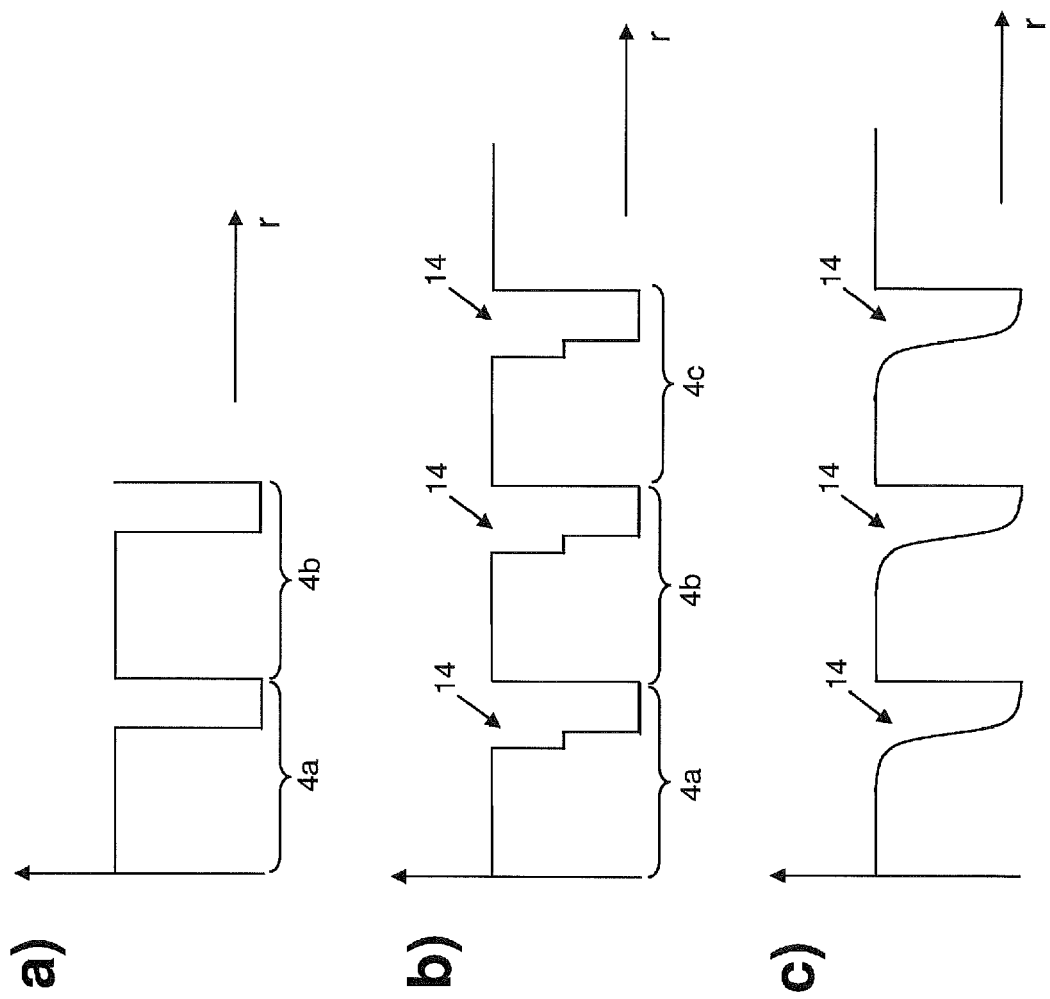

MICROSCOPE FOR CONVENTIONAL FLUORESCENCE MICROSCOPY AND TOTAL INTERNAL REFLECTION MICROSCOPY

CROSS-REFERENCE TO RELATED APPLICATION

This application is a national phase based on PCT/EP2008/051535 having a filing date of Feb. 8, 2008 and claims the priority of the German patent application DE 102007018922.4 having a filing date of Feb. 12, 2007, the entire content of both applications being herewith incorporated by reference.

BACKGROUND OF THE INVENTION

The present invention relates to a microscope for conventional fluorescence microscopy (epi-fluorescence) and for total internal reflection microscopy, comprising at least one light source for the conventional fluorescent illumination and at least one light source for the evanescent illumination, and comprising one objective, wherein the illumination light coming from the light sources on different illumination paths is passed via a beam combiner into the objective and from there to the specimen, the beam combiner being structured such that it directs the illumination light used for the conventional fluorescent illumination and the illumination light used for the evanescent illumination into the objective in geometrically separated beam paths.

The total internal reflection microscopy makes use of the refractive behavior of light during the transition from an optically denser medium to an optically thinner medium. Thus, for instance, the transition from cover glass (n1=1.518) to water (n2=1.33) yields a critical angle of 61°, the angle of total reflection. Under the conditions of total reflection (angle ≥61°), a standing evanescent wave forms in the medium having the lower refractive index. The intensity of this wave drops exponentially relative to the distance from the interface. For this reason, fluorophores located far away from the interface are not excited. The background fluorescence is drastically reduced. The image contrast is improved in this process while, at the same time, the resolution is considerably increased. A prerequisite for utilizing the afore-described phenomenon is a sufficiently large difference between the refractive indices of the cover glass and of the medium.

U.S. Pat. Appln. No. US 2002/0097489 A1 discloses a microscope with evanescent illumination of a specimen. The microscope comprises a white-light source whose light is coupled into the specimen slide via a slit aperture through the microscope objective for purposes of evanescent illumination. The illumination light propagates in the specimen slide due to total internal reflection, wherein the specimen is only illuminated in the region of the evanescent field that extends from the specimen slide. Microscopes of this type are known by the acronym TIRFM (Total Internal Reflection Fluorescent Microscope). The z-resolution of TIRF microscopes is exceptionally good owing to the fact that the evanescent field extends only about 100 nm into the specimen.

German patent application DE 101 08 796 A1 discloses a high-aperture objective, particularly for TIRF applications. The objective consists of a first lens having a positive refractive power, a second lens having a negative refractive power, the focal length ratio between the two lenses lying within the range from −0.4 to −0.1, and, the total refractive power being greater than zero. Further, the objective comprises two positive lenses whose diameter-to-focal length ratio is greater than 0.3 and smaller than 0.6. Furthermore, the objective comprises a negative lens and a collective lens, the negative lens facing the front group and the focal length ratio between the negative lens and the collective lens lying between −0.5 and −2.

German patent application DE 102 17 098 A1 discloses an incident-illumination arrangement for TIRF microscopy. The incident-illumination arrangement contains a source of illumination that, during operation, emits a polarized illuminating beam bundle that propagates at an angle relative to the optical axis, as well as a deflecting device that deflects the illuminating beam bundle and couples it into the objective parallel to the optical axis. With this incident-illumination arrangement, it is provided that the illuminating beam bundle emitted by the source of illumination has s-polarization and p-polarization directions with a phase difference and the deflecting device reflects the illuminating beam bundle x times, wherein $x=(n \times 180° - d)/60°$.

German patent application DE 101 43 481 A1 discloses a microscope for TIRM (Total Internal Reflection Microscopy). The microscope has a housing and an objective. The illumination light emitted by an illumination device can be coupled in by means of an adapter that can be slid into the microscope housing.

U.S. Pat. Appln. No. US 2004/0001253 A1 discloses a microscope with an optical illumination system that allows a simple switching over between evanescent illumination and reflection illumination. The illumination system comprises a source of laser light whose light is coupled into an optical fiber. Moreover, a coupling-out optical system is provided that focuses the light coming out of the fiber into a rear focal point of the microscope objective. The optical fiber can be moved in a plane perpendicular to the optical axis of the microscope objective.

German patent application DE 102 29 935 A1 discloses a device for the coupling in of light in a microscope. There, laser light is directed onto the preparation in the light field aperture plane by way of an in-coupling light-conducting fiber configured as a slider. The invention is particularly well-suited for the TIRF method.

In scanning microscopy, a specimen is illuminated with a light beam so that the detection light emitted by the specimen can be observed as reflection light or fluorescent light. The focus of an illumination beam bundle is moved in a specimen plane by means of a controllable beam deflector, usually by tilting two mirrors, wherein the deflection axes are usually perpendicular to each other, so that one mirror deflects in the x-direction while the other deflects in the y-direction. The mirrors are tilted by means of, for example, galvanometric actuators. The power of the detection light coming from the object is measured as a function of the position of the scanning beam. Normally, the actuators are fitted with sensors in order to determine the current position of the mirror. Especially in the case of confocal scanning microscopy, an object is scanned in three dimensions with the focus of a light beam.

A confocal scanning microscope generally comprises a light source, a focusing optical system with which the light from the light source is focused onto a pinhole (the so-called excitation aperture), a beam splitter, a beam deflector for beam control, a microscope optical system, a detection aperture and the detectors to detect the detection light or fluorescent light. The illumination light is coupled in by means of a beam splitter. The fluorescent light or reflection light coming from the object returns to the beam splitter via the beam deflector, passes through the beam splitter in order to be subsequently focused onto the detection aperture downstream of which the detectors are located. This detector arrangement is called a descan arrangement. Detection light that does not stem directly from the focus region takes a different light path and does not pass through the detection aperture, so that point information is obtained that yields a three-dimensional image as a result of sequential scanning of the object with the focus of the illuminating beam bundle. For the most part, a three-dimensional image is obtained by means of layerwise image data acquisition.

With the microscopes known from the prior art, the evanescent illumination is regularly coupled in within the scope of two-dimensional solutions, even if the adjustment unit used in such cases is always configured one-dimensionally. Thus, the coupling-in is done, for instance, by means of a so-called neutral splitter, i.e. by means of a mirror that reflects light to a certain extent and otherwise transmits light. Coupling-in by means of a dichroitic splitter is also known. In this case, it is a special mirror that, except for one specific wavelength, reflects all other wavelengths. Another known approach is the coupling-in by means of a polarization splitter. Here, the lasers for the evanescent illumination (TIRF illumination) and the laser for the conventional epi-fluorescent illumination are polarized orthogonally with respect to each other and then combined. As a one-dimensional possibility for coupling in the requisite source of radiation, it is likewise already known to use small additional mirrors in the illumination beam path for the epi-fluorescent illumination.

The methods and devices known so far for coupling in one or more radiation sources for evanescent illumination are problematic in practice since restrictions on the specific properties of the respectively used radiation source arise from the type of coupling-in. Coupling-in via a neutral splitter has the disadvantage that deteriorations in the performance occur both in the case of the radiation source for the evanescent illumination and also in the case of the radiation source for the epi-fluorescent illumination. Coupling-in via a dichroitic splitter has the disadvantage that a specific wavelength or a specific wavelength range must be specified. If one wishes to change the wavelength within the scope of such a realization, then the beam combiner or mirror has to be changed as well. Coupling-in by means of a polarization splitter also brings with it the serious disadvantage that all components used must be designed as polarization-preserving. Moreover, the use of a polarization splitter means dispensing with a further degree of freedom at the radiation sources. Finally, coupling-in by means of small additional mirrors in the illumination beam path of the epi-fluorescent illumination is out of question right from the beginning because this involves a one-dimensional solution. The additional mirrors moreover result in a partial covering of the epi-fluorescent illumination so that in this regard, too, this possibility for coupling-in is not acceptable.

German patent DE 103 09 269 B4 discloses a device for total internal reflection microscopy, in which for beam combination of the illumination light used for the epi-fluorescent illumination as well as the illumination light used for the evanescent illumination a beam combiner is provided which is structured such that it has an outer transmissive area for the illumination light used for the evanescent illumination as well as an inner reflective area for the illumination light used for the conventional fluorescent illumination. What is disadvantageous is that the areas of the beam combiner have to be precisely adapted to the objective used so that a change of the objective without a simultaneous change of the beam combiner is not possible. In this respect, each change of objective requires enormous adjustment work.

SUMMARY OF THE INVENTION

The object to be solved by the present invention is to configure and develop a microscope for conventional fluorescence microscopy (epi-fluorescence) and for total internal reflection microscopy such that a coupling-in of the evanescent illumination is possible without the disadvantages known from the prior art. Moreover, the coupling-in shall take place in a constructively simple way and allow automatic microscope operation even given changing operating parameters, in particular given changing objectives, with a maximum of flexibility.

The microscope according to the invention solves the above object by providing a microscope for conventional fluorescence microscopy (epi-fluorescence) and for total internal reflection microscopy, comprising:

a first light source emitting conventional fluorescent illumination light along a first illumination path; a second light source emitting evanescent illumination light along a second illumination path that differs from said first illumination path; an objective emitting light onto an object to be viewed; a beam combiner directing the conventional fluorescent illumination light and the evanescent illumination light into the objective while keeping said first and second beam paths between the beam combiner and the objective geometrically separated, wherein the beam combiner comprises at least two spatially separated first zones for coupling in the conventional fluorescent illumination light; and at least two spatially separated second zones for coupling in the evanescent illumination light; wherein said first and second zones are adapted in their size and position to objective pupils of different objectives.

Accordingly, the generic microscope is characterized in that the beam combiner has at least two spatially separated zones for the coupling-in of the illumination light used for the conventional fluorescent illumination and at least two spatially separated zones for the coupling-in of the illumination light used for the evanescent illumination, the individual zones being adapted in their size and position to the objective pupils of different objectives.

According to the invention is has been recognized that a high degree of flexibility can be achieved in that the beam combiner not only has one single region for the coupling-in of the illumination light used for the conventional fluorescent illumination as well as one single region for the coupling-in of the illumination light used for the evanescent illumination, but that each time at least two such regions are provided. According to the invention, these regions are each adapted in their size and position to the objective pupils of different objectives. Accordingly, the microscope can be operated with different objectives without a complex change of the beam combiner being necessary. In particular, it is not necessary to readjust the beam path after each objective change. In addition, the entire structure is considerably simpler since for the beam combiners no switching-over mechanisms or the like, including associated electronics, have to be established.

In the inventive microscope use is made of the fact that the distance to the optical axis, with which distance the illumination light used for the evanescent illumination has to be coupled into the objective in order to implement a total internal reflection illumination varies as a function of the objective pupil. The objective pupil is calculated from the focal length and the numerical aperture of the respective objective. With respect to the coupling-in of the epi-fluorescent illumination indeed some deteriorations in the performance might occur in the inventive microscope. However, compared to an alternative configuration of the beam combiner in the form of a polarization splitter, in which typically 50% of the performance are lost, this deterioration in performance is tolerable.

With regard to a particularly simple handling, the beam combiner is preferably arranged in the plane of the objective pupil or in a plane conjugated with respect thereto or at least near such a plane.

Specifically, the beam combiner is a structured mirror, namely a structured sectional mirror. The reflecting mirror surface can be vapor-deposited or produced in some other fashion.

Specifically, it is feasible that the beam combiner is located on the optical axis between the light source for the evanescent illumination and the objective, and that the zones for the coupling-in of the illumination light used for the conventional fluorescent illumination are designed as reflective surfaces and the zones for the coupling-in of the illumination light used for the evanescent illumination are designed as transmissive surfaces. As a result thereof, it is possible to reflect the illumination for the normal fluorescence via the mirror and to position the mirror for the evanescent illumination through the mirror in the objective pupil.

In principle, it is also possible for the two axes of the illumination light sources to be exchanged. Accordingly, the beam combiner can be disposed on the optical axis between the light source for the conventional fluorescent illumination and the objective, the zones for the coupling-in of the illumination light used for the evanescent illumination then being designed as reflective surfaces and the zones for the coupling-in of the illumination light used for the conventional fluorescent illumination then being designed as transmissive surfaces.

Arbitrary structures or geometries of the respective zones of the beam combiner are feasible, and only the geometric separation of the two beam paths for the different types of illumination is important. Particularly preferred is an embodiment in which the individual zones of the beam combiner are formed as coaxially extending circular annular surfaces or elliptical annular surfaces. An embodiment having angular surfaces is likewise feasible, the outer surfaces surrounding the inner surfaces entirely or at least in parts.

With regard to a user-friendly exchangeability of the objectives, an exchange mechanism for the objectives can be provided, which is preferably designed as a revolving device or as a slide. Additionally or alternatively, an exchange mechanism for the beam combiners can be provided, which can be equipped with beam combiners, each of which could be adapted in the above-described manner to different objective groups. Here, the exchange mechanism can be equipped already on the part of the manufacturer or can be individually equipped on the part of the user in accordance with the specific applications to be implemented.

Advantageously, the annular surfaces of the beam combiner are adapted in their size and position to the objective pupils of at least two of the objectives provided with the exchange mechanism. An adaptation to two different objectives can be achieved by the formation of altogether four spatially separated annular surfaces, two of the annular surfaces being used for reflecting/transmitting the illumination light used for the evanescent illumination and the two other annular surfaces being used for transmitting/reflecting the illumination light used for the conventional fluorescent illumination. An expansion in terms of an adaptation to three different objectives with altogether six annular surfaces or to even more than three different objectives having a correspondingly increased number of annular surfaces is basically feasible.

Taking into account the typical geometries of the beam paths used, it is advantageous to adapt the inner annular surfaces in their size and position to the objective having the smaller objective pupil and to adapt the outer annular surfaces in their size and position to the objective having the larger objective pupil. Here, the terms "inner" and "outer" refer to the radial distance to the optical axis of the objective.

Regarding the separations of the individual annular surfaces with respect to each other, it can be provided that the individual annular surfaces directly adjoin one another. With such an embodiment a best possible adaptation to several specifically predetermined objectives can be realized. However, typical specimens to be examined by means of total internal reflection microscopy usually occur in aqueous solutions whose refractive index lies above 1.33, i.e. above the refractive index of water. If one is committed to an aperture of, for example, 1.35 as the limit between two of the afore-mentioned annular surfaces of the beam combiner, this means that it is impossible to achieve the maximum attainable penetration depth. As a result of the non-linear relationship between the penetration depth and the angle of incidence, this difference should not be neglected.

For the afore-mentioned reason, it can be advantageous to form some sort of separating region or transition region between the individual annular surfaces. The transition region can be partly light-transmitting and partly reflecting. Specifically, the transition region can, for example, be embodied in the sense of a neutral splitter with all feasible relationships depending on the application. It is also possible that the transition region is designed as a gradient-index mirror. In a further feasible embodiment the degree of reflection or, respectively, the degree of transmission of the beam combiner has a stepped curve in the transition region.

Of particular importance is the finding that the size and the position of the annular surfaces and/or of the transition regions of the beam combiner and thus the beam combiner as a whole can also be adapted depending on the refractive index of the solution containing the specimen to be examined or the specimen itself. Additionally, in the case of a given beam combiner, an intermediate image with variable magnification can be provided between the beam combiner and the objective so that the size of the pupil can be adapted to the beam combiner within certain limits.

With reference to the respective light sources, it should be noted that in each case two or more light sources can also be used simultaneously for the conventional fluorescent illumination and/or for the evanescent illumination, wherein the respective illumination light can be appropriately coupled in. It is also feasible that in addition to the evanescent illumination, a simultaneously operating laser having the function of a manipulation laser can be used. This manipulation laser can be used for the conventional epi-fluorescent excitation.

Various possibilities exist for advantageously configuring and developing the teaching of the present invention. For this purpose, reference is made, on the one hand, to the claims that are dependent on claim 1, and on the other hand, to the following explanation of preferred embodiments of the invention with reference to the drawing. Generally preferred configurations and developments of the teaching are also explained in conjunction with the explanation of the preferred embodiments of the invention with reference to the drawing.

BRIEF DESCRIPTION OF THE DRAWINGS

FIG. 2 is a schematic view of an embodiment of a beam combiner that can be used in the arrangement according to FIG. 1.

FIG. 3 is a schematic view of differently structured embodiments of a beam combiner that can be used in the arrangement according to FIG. 1.

DETAILED DESCRIPTION OF THE DRAWINGS

Figure 1:
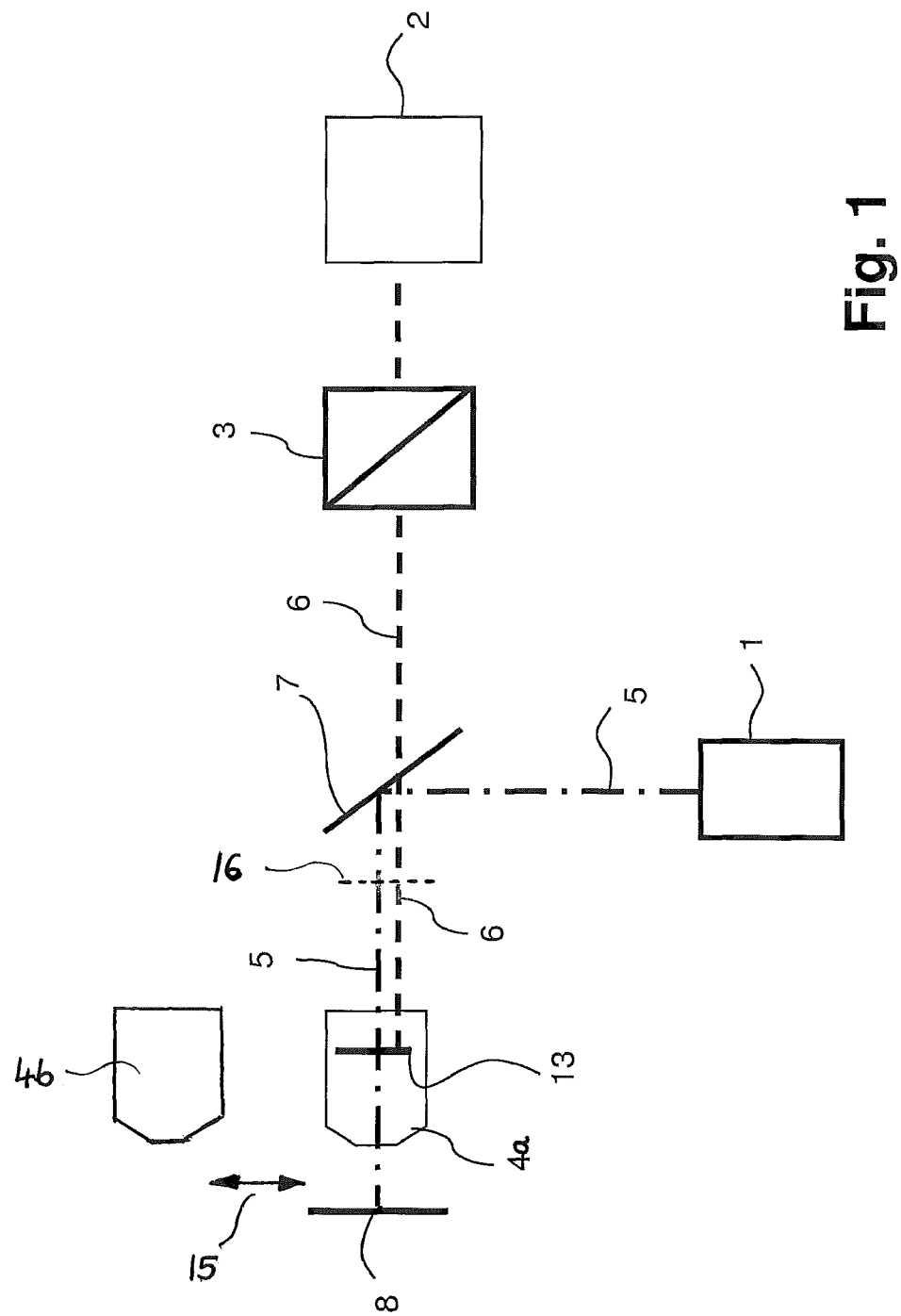
FIG. 1 is a schematic view of the basic course of the illumination beam path in a microscope according to the invention.

FIG. 1 shows the basic set-up of a microscope according to the invention which is suitable both for conventional fluorescence microscopy (epi-fluorescence) and for total internal reflection microscopy. More precisely, FIG. 1 shows the illumination beam path in relation to both operating modes. The microscope comprises a first light source 1 for the conventional fluorescent illumination and a second light source 2 for the evanescent illumination, wherein a scanner 3 can be provided.

Further, the microscope comprises two objectives 4a and 4b that can be replaced against each other by an exchange mechanism 15, wherein the illumination light coming from the light sources 1, 2 on different illumination paths 5, 6 is passed via a beam combiner 7 into the objectives 4a or 4b and from there to the specimen 8. The beam combiner is arranged in a plane that is conjugated with respect to the plane 13 of the objective pupil. An intermediate image 16 is formed between the beam combiner 7 and the objectives 4a or 4b, the intermediate image having a variable magnification.

FIG. 2 shows schematically together with FIG. 1 that the beam combiner 7 is structured such that it guides the illumination light used for the conventional fluorescent illumination and the illumination light used for the evanescent illumination into the objective 4 in geometrically separated beam paths 5, 6. To this end, two spatially separated annular surfaces 9, 10 for coupling in the illumination light used for the conventional fluorescent illumination and, in addition, two spatially separated annular surfaces 11, 12 for coupling in the illumination light used for the evanescent illumination are provided. In other words, the beam combiner 7 is configured as a structured sectional mirror having a total of four spatially separated annular surfaces 9 to 12. According to the invention, the individual annular surfaces 9 to 12 are adapted in their size and position to the objective pupils of two different objectives, as will be explained in more detail further below.

In the embodiment shown in FIG. 2, the regions 9, 10 illustrated in black represent the mirrored part of the beam combiner 7, by means of which the epi-fluorescent illumination is applied to the optical axis. The regions 11, 12 illustrated in white are transparent to the light and are used to transmit the TIRF illumination, and specifically within the arrangement according to FIG. 1. It should be noted here that the beam combiner 7 can have a structure inverted with respect to the structure previously discussed.

FIG. 3 shows three different embodiments of a beam combiner 7 for use in an arrangement according to FIG. 1, the curve of the degree of transmission or, respectively, the degree of reflection as a function of the radial distance r to the optical axis of the objective 4 being specifically illustrated each time. The illustrations in FIG. 3 refer to an embodiment of the beam combiner 7 as shown in FIG. 2, i.e. with a coupling-in of the TIRF illumination in transmission and a coupling-in of the epi-fluorescent illumination in reflection. Accordingly, in FIG. 3 the relative ratio of the degree of reflection to the degree of transmission of the beam combiner is entered on the ordinate.

As shown in FIG. 3a, in the center of the beam combiner 7 at first a mirrored annular surface or circular surface is provided which corresponds to the region 9 illustrated in black in FIG. 2. This region is adjoined outwardly by a transmissive region for the evanescent illumination which corresponds to the region 11 illustrated in white in FIG. 2. The two mentioned regions are adapted in their size to a first objective 4a. In the specifically illustrated embodiment, the objective 4a is a 100×1.46 objective (magnifying power equal to 100, numerical aperture $A_N$=1.46). If one refers to water having a refractive index of 1.33 as an exemplary specimen material, then the range of the epi-fluorescence with this objective 4a lies within the range from r=0 mm to r=2.66 mm. TIRF takes place in a range from r=2.66 to r=2.92. The radii of the reflective or, respectively, transmissive annular surfaces 9 and 11 are dimensioned accordingly.

The outwardly adjoining annular surfaces—reflective annular surface 10 as well as transmissive annular surface 12—are adapted to a 63×1.46 objective 4b in the illustrated example. With this objective the epi-fluorescence lies in a range from r=0 mm to r=4.1 mm and the range within which TIRF takes place is from r=4.1 mm to r=4.65 mm.

The embodiment illustrated in FIG. 3b refers to a beam combiner 7 having a total of six annular surfaces which are adapted in their size and position to three different objectives 4a, 4b, 4c. Specifically, the objective 4a is a 100×1.46 objective, the objective 4b is a 63×1.46 objective, and the objective 4c is the objective having the largest pupil of the 3 objectives 4a, 4b and 4c. In principle, further annular surfaces can follow which are adapted to further objectives. Basically, the innermost annular surfaces are always adapted to the microscope having the smallest objective pupil and the outermost annular surfaces are adapted to the objective having the largest pupil.

In FIG. 3b it can further be seen that a transition region 14 is formed at the inner edge of the annular surfaces for coupling in the illumination light used for the evanescent illumination. In each of the transition regions 14 a stepped curve of the degree of reflection is realized. Although in FIG. 3b, for reasons of clarity, only one step per transition region 14 is shown each time, several steps per transition region 14 can likewise be realized. The provision of transition regions 14 offers the advantage of taking into account different refractive indices of the solution containing the specimen to be examined or, respectively, of the specimen itself. If the inner edge of an annular surface for the coupling-in of TIRF illumination light is, for instance, adapted to Hepes, a nutrient solution having a refractive index of 1.38, then given an aqueous solution having a refractive index of 1.33 the maximum achievable depth of penetration could no longer be attained. By the formation of a stepped transition 14 in this region this problem can be avoided, and the theoretically maximum possible depth of penetration can also be reached for the aqueous solution. At the outer edge of an annular surface for the coupling-in of TIRF illumination no transition region is necessary since the outer edge of a TIRF region is unambiguously given by the numerical aperture of the respective objective.

FIG. 3c finally shows the same embodiment as illustrated in FIG. 3b, instead of stepped transition regions gradually extending transition regions 14 in the sense of gradient-index mirrors being realized. Of course, in one and the same beam combiner 7 also different transition regions can be realized, namely, for instance, a stepped and a gradually extending transition region, or stepped transition regions which each have a different number of steps.

With reference to features which cannot be taken from the Figures, reference is made to the general part of the description in order to avoid repetitions.

Finally, it should be noted that the above discussed embodiments merely serve to describe the claimed teaching but do not restrict the teaching to the embodiments.

What is claimed is:

1. A microscope for conventional epi-fluorescence microscopy and for total internal reflection microscopy, comprising:
a first light source emitting conventional fluorescent illumination light along a first illumination path;
a second light source emitting evanescent illumination light along a second illumination path that differs from said first illumination path;
at least a first and a second objectives for emitting light onto an object to be viewed, the first and the second objectives being interchangeable against each other for selecting either the first or the second objective with the first objective having a smaller pupil than the second objective;
a beam combiner directing the conventional fluorescent illumination light and the evanescent illumination light into a selected one of the first and second objectives while keeping said first and second illumination paths between the beam combiner and the objective geometrically separated, wherein the beam combiner comprises:
at least two spatially separated first zones for coupling in the conventional fluorescent illumination light; and
at least two spatially separated second zones for coupling in the evanescent illumination light; wherein
said first and second zones are adapted in their size and position to the objective pupils of the first and second objectives.

2. The microscope according to claim 1, wherein the beam combiner is arranged substantially in one of the plane of the objective pupil and a plane conjugated with respect thereto.

3. The microscope according to claim 1, wherein the beam combiner is arranged on an optical axis between the evanescent illumination light source and the selected one of the first and second objectives, the first zones for coupling in the conventional fluorescent illumination light are designed as reflective surfaces, and the second zones for coupling in the evanescent illumination light are designed as transmissive surfaces.

4. The microscope according to claim 1, wherein the beam combiner is arranged on an optical axis between the conventional fluorescent illumination light source and the selected one of the first and second objectives, the second zones for coupling in the evanescent illumination light are designed as reflective surfaces, and the first zones for coupling in the conventional fluorescent illumination light are designed as transmissive surfaces.

5. The microscope according to claim 1, wherein the first and second zones of the beam combiner are configured as coaxially extending circular annular surfaces or elliptical annular surfaces.

6. The microscope according to claim 5, wherein the inner annular surface of the annular surfaces is adapted in its size and position to the first objective and an outer annular surfaces of the annular surfaces is adapted in its size and position to the second objective.

7. The microscope according to claim 5, wherein the annular surfaces directly adjoin one another.

8. The microscope according to claim 5, wherein at least one of a separation region and transition region adjoin an inner edge of the annular surface for coupling-in the evanescent illumination light.

9. The microscope according to claim 8, wherein the transition region is designed as a neutral splitter.

10. The microscope according to claim 8, wherein the transition region is designed as a gradient-index mirror.

11. The microscope according to claim 5, wherein a transition region adjoins an inner edge of the annular surface for coupling-in the evanescent illumination light and that transition region is partly light-transmitting and partly reflecting.

12. The microscope according to claim 5, wherein a transition region adjoins an inner edge of the annular surface for coupling-in the evanescent illumination light and at least one of an amount of reflection and an amount of transmission of the beam combiner has a stepped curve in the transition region.

13. The microscope according to claim 5, wherein a size and a position of at least one of the annular surfaces and transition regions of the beam combiner are adapted to a refractive index of at least one of a solution containing an object to be examined and the object itself.

14. The microscope according to claim 1, wherein an exchange mechanism is provided for at least one of the objectives and the beam combiner.

15. The microscope according to claim 14, wherein said exchange mechanism is provided for at least the objectives and annular surfaces of the beam combiner are adapted in their size and position to the objective pupils of at least two objectives.

16. The microscope according to claim 14, wherein the exchange mechanism is a revolving head.

17. The microscope according to claim 14, wherein the exchange mechanism is a slide.

18. The microscope according to claim 1, wherein an intermediate image with variable magnification is provided between the beam combiner and the selected one of the first and second objectives so that a size of the pupil can be adapted to the beam combiner.

19. The microscope according to claim 1, wherein two or more light sources each are provided for at least one of the conventional fluorescent illumination and the evanescent illumination.

20. The microscope according to claim 1, wherein the first light source is an operating manipulation laser operating simultaneously to the evanescent illumination.

* * * * *